(12) United States Patent
Lai et al.

(10) Patent No.: US 7,633,486 B2
(45) Date of Patent: *Dec. 15, 2009

(54) COMPUTER INPUT APPARATUS

(75) Inventors: Sheng-Yeh Lai, Hsin Chu (TW);
Ming-Hui Kuo, Hsin Chu (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 609 days.

This patent is subject to a terminal disclaimer.

(21) Appl. No.: 11/431,778

(22) Filed: May 10, 2006

(65) Prior Publication Data

US 2006/0202962 A1 Sep. 14, 2006

Related U.S. Application Data

(63) Continuation-in-part of application No. 11/353,308, filed on Feb. 14, 2006.

(60) Provisional application No. 60/655,644, filed on Feb. 22, 2005.

(51) Int. Cl.
*G09G 5/00* (2006.01)

(52) U.S. Cl. .................. 345/156; 345/166; 345/163

(58) Field of Classification Search ................. 345/156, 345/163–167

See application file for complete search history.

(56) References Cited

U.S. PATENT DOCUMENTS

| | | | |
|---|---|---|---|
| 6,172,354 B1 * | 1/2001 | Adan et al. ................ 250/221 |
| 6,232,958 B1 * | 5/2001 | Casebolt .................... 345/156 |
| 7,193,618 B2 * | 3/2007 | Morehouse ................ 345/179 |
| 7,221,355 B1 * | 5/2007 | Ding ......................... 345/156 |
| 2005/0195169 A1 * | 9/2005 | Lin ............................ 345/163 |
| 2006/0132443 A1 * | 6/2006 | Chien Wu .................. 345/166 |

* cited by examiner

*Primary Examiner*—Amare Mengistu
*Assistant Examiner*—Premal Patel
(74) *Attorney, Agent, or Firm*—Tung & Associates (57) ABSTRACT

A computer input apparatus is disclosed which has improved safety control. The computer input apparatus includes a calibration circuit to control the operation current of a coherent light source to be above a minimum threshold required for normal operations, but below an upper threshold for safety reason. The computer input apparatus includes a fault detection circuit to monitor fault conditions. When this computer input apparatus employs a coherent light source, it does not require any optical lens to diminish optical power.

13 Claims, 6 Drawing Sheets

COMPUTER INPUT APPARATUS

CROSS REFERENCE

This application is a continuation in part of co-pending application U.S. Ser. No. 11/353,308 filed on Feb. 14, 2006, which claims priority to U.S. Provisional Application No. 60/655,644 filed on Feb. 22, 2005.

FIELD OF THE INVENTION

The present invention generally relates to a computer input apparatus, and, in particular, to an optical mouse having a safeguard mechanism for eye safety.

BACKGROUND OF THE INVENTION

In personal computers, computer mice are popular means for inputting data and providing cursor control. A conventional mechanical mouse generally employs a rolling ball and at least two encoder wheels for x- and y-axis input operation. The respective encoder wheels are rotated by the rolling ball when a user moves the mouse along a flat surface, such as a mouse pad. The encoder wheels will intermittently block certain light propagation in the mouse and associated electronic signals are generated to control cursor movement on a computer display. However, the performance of the mechanical mouse may degrade through extended use due to ball abrasion and dust. Moreover, the mechanical mouse uses a bulky and heavy steel ball, which is also inconvenient for the user.

To overcome such drawbacks, optical mice were developed that comprise a light source such as a light emitting diode (LED), a light receiver such as a photo diode and associated components. The conventional optical mouse is operated on a patterned surface for modulating a light emitted from the light source. The modulated light is received by the light receiver to identify mouse movement and control cursor motion.

However, the above-mentioned optical mouse required a specialized mouse pad for normal operation, which limited the applicability thereof. Due to advancement of complementary metal oxide semiconductor (CMOS) image sensors and digital signal processing, a CMOS sensor array can be used in the optical mouse to overcome the above problem. The optical mouse may be operated on a non-transparent flat surface and the detected signals of the CMOS sensor array are analyzed to identify mouse movement and control cursor motion.

For optical mice using a non-coherent light source, such as an LED, the micro-texture of a working surface is discriminated for controlling cursor movement. For optical mice using a coherent light source, such as a laser diode, a complex diffraction pattern, called a speckle pattern, is exploited for controlling cursor movement even when the optical mouse is placed on a mirror like working surface.

U.S. Pat. No. 6,256,016 to Piot et al., entitled "Optical detection system, device, and method utilizing optical matching," discloses an optical mouse with a coherent light source and uses an artificially limited anisotropic aperture to enhance optical resolution. U.S. Pat. No. 6,246,482 to Kinrot et al., entitled "Optical translation measurement," discloses an optical mouse with a coherent light source and uses a reference beam produced by a grating to enhance optical resolution. US Patent publication 20040227954 to Xie, entitled "Interferometer based navigation device," discloses an optical mouse with a coherent light source and uses an interferogram to obtain phase information and to enhance optical resolution. However, in above-mentioned prior art optical mice, complicated optical elements are required and the cost of the optical mouse is increased.

US Patent publication 20040160998 of Gruhlke et al., entitled "Method and apparatus for modifying the spread of a laser beam," mentions that optical mice containing laser devices are potentially hazardous to the eye. This safety issue is considered by International Standards for The Safety of Laser Products (ISSLP). Class 1 laser devices are defined as being safe under reasonably foreseeable—although perhaps not recommended—conditions of use, such as the use of optical instruments such as a magnifying lens for intra-beam viewing.

US Patent publication 20040160998 also mentions that, according to the ISSLP, the maximum-allowed power, i.e., the acceptable emission light (AEL) level, for a commonly used single-mode 850 nanometer (nm) wavelength Class 1 laser device is 0.78 milliwatts (mW) when measured according to the ISSLP-defined standard. The defined standard is the amount of flux (power per unit area) through a 7 millimeter (mm) aperture in a radial plane that is 14 mm from the point where the laser beam exits the device. Thus, if the flux of the laser beam that passes through the 7 mm aperture is less than 0.78 mW, then the laser device is considered Class 1 safe.

US Patent publication 20040160998 further discloses an optical mouse with a coherent light source and uses an optical train to modify laser beam spread. The laser beam is advantageously spread to prevent a dangerous laser beam with excessive intensity passing through an aperture of the optical mouse to help ensure safety. However, this patent publication employs several complicated optical elements to dilute the light intensity of the laser beam or divert the direction of the optical paths. For example, the patent utilized an optical train element including a focusing lens, a diffractive focusing vortex lens, a beam splitting device or a two dimensional diffraction grating whose cost is expensive.

U.S. Pat. No. 6,704,183 to Stafford et al., entitled "Fault detection in an LED bias circuit," discloses a bias circuit for preventing excessive emission from light emitting diodes. The disclosure of this patent is hereby incorporated by reference. This disclosure employs two resistors, at least two current legs and several comparators for detecting current passing through an LED; however, the two current legs may consume a lot of power from the LED and thus deteriorate the performance of the LED.

US Patent publication 20050180473 to Brosnan, entitled "Open loop laser power control in optical navigation," mentions a current output of a drive signal, modulated between two current settings, being applied to a laser diode. This disclosure describes controlling the power consumption of the laser diode by a toggling signal. However, this disclosure requires a complex analog modulator or digital analog converter (DAC) to control the current flowing through the laser diode. Moreover, a plurality of current settings is necessary for this disclosure.

The disclosures of all the abovementioned publications have been incorporated in the parent application by reference.

The abovementioned disclosures provide at least one lens to diminish the emitting power of laser beams which are dangerous to humans' eyes.

According to the present invention, by utilizing a coherent light source, an optical mouse without a lens for diminishing optical power, can be realized. Preferably, a control means is provided to restrict excessive power so that the optical mouse is kept under stable and safe conditions.

SUMMARY OF THE INVENTION

One aspect of the present invention is to provide an optical mouse using a coherent light source and having an inexpensive safety mechanism.

According to one aspect of the present invention, an optical mouse comprises a control circuit to control the optical power from a coherent light source to keep the optical power below a power limit value for eye safety.

According to another aspect of the present invention, the control circuit comprises a fault detection circuit (e.g., a current sensing circuit) to disconnect the current supplied to the coherent light source when the optical power is excessive and dangerous to human eyes.

According to another aspect of the invention, a computer input apparatus comprises a housing; a light source; a sensor; and a control circuit; wherein the light source projects light on a working surface and the sensor captures reflected images from the working surface. The computer input apparatus does not require any lens to diminish optical power. The control circuit includes a calibration circuit for restricting the power of the emitting laser beams to be within a safety value, but above a minimum threshold value required for normal operations. Moreover, the control circuit preferably includes a fault detection circuit to monitor current flowing through the light source. If the current flowing through the light source exceed a safety limit, the fault detection circuit immediately cuts off the path of the current so as to avoid damage caused by the laser beams from the computer input apparatus.

BRIEF DESCRIPTION OF THE DRAWINGS

Various objects and advantages of the present invention will be more readily understood from the following detailed description when read in conjunction with the appended drawing, in which.

DESCRIPTION OF EMBODIMENTS OF THE INVENTION

Figure 1:
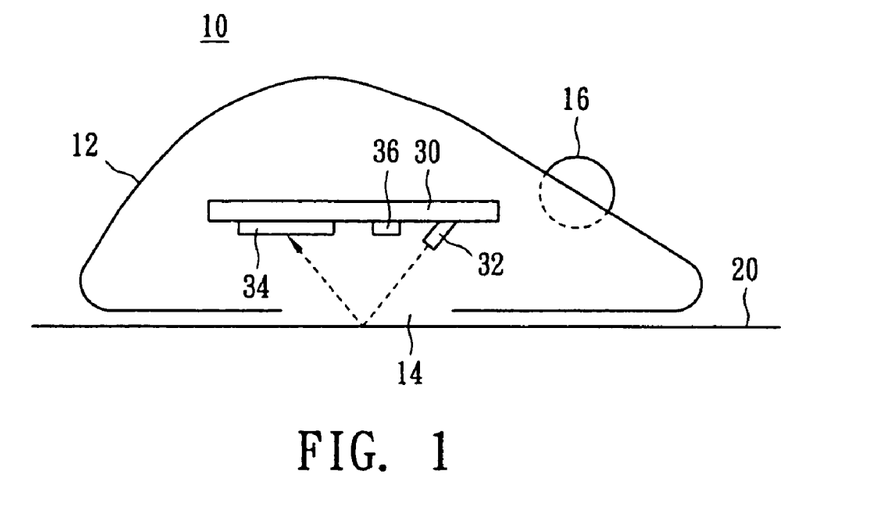
FIG. 1 shows a sectional view of an optical mouse according to a preferred embodiment of the present invention.

FIG. 1 shows a sectional view of an optical mouse 10 according to a preferred embodiment of the present invention. The optical mouse 10, which is placed on a working surface 20, comprises a housing 12, a circuit board 30 placed within the housing 12, a light source 32 arranged on the circuit board 30 and having a predetermined inclined angle with respect to the working surface 20, a sensor 34 arranged on the circuit board 30, and a control circuit 36 arranged on the circuit board 30. The predetermined inclined angle between the beam and the normal vector of the working surface 20 is, for example, about 47.5 degrees. However, other inclined angles can be used as long as the desired optical resolution is achieved. Moreover, the optical mouse 10 optionally comprises an aperture 14 at a bottom portion of the housing 12 and a third-axis wheel 16 arranged on a top face of the housing 12.

In another respect of the preferred embodiment, the optical mouse 10 placed on a working surface 20 comprises a housing 12 upholding a navigation device comprising a circuit board 30, a light source 32 and a sensor 34 detecting the reflected optical image from the working surface 20 which is projected by the light source 32. The housing 12 may contain an aperture 14 between the light source 32 and the working surface 20 or the housing 12 may be made of a transparent material in the portion between the light source 32 and the working surface 20. Moreover, a computer mouse 10 usually contains a control portion including two or three buttons, a roller ball or a rolling wheel. In a computer mouse utilizing a non-coherent light source, the light source 32 is an LED diode. In a computer mouse utilizing a coherent light source, the light source 32 may be a laser device, e.g., a Vertical Cavity Surface Emitting Laser (VCSEL). To detect images, the sensor 34 may employ a CMOS image sensor or a CCD (Coupling Charge diode) sensor. The sensor 34 of the navigation device continues to capture images reflected from the working surface 20 in a time scale as the computer mouse 10 is moved by hand along a path indicating the position of a pointer on a computer screen. The captured images are further processed by a control circuit 36 positioned on the circuit board 30. The control circuit 36 is shown as an external circuit to the sensor 34, but may be made as an integral part of the sensor 34. The latter arrangement may save cost and enhance the computation speed for tracking.

Figure 3:
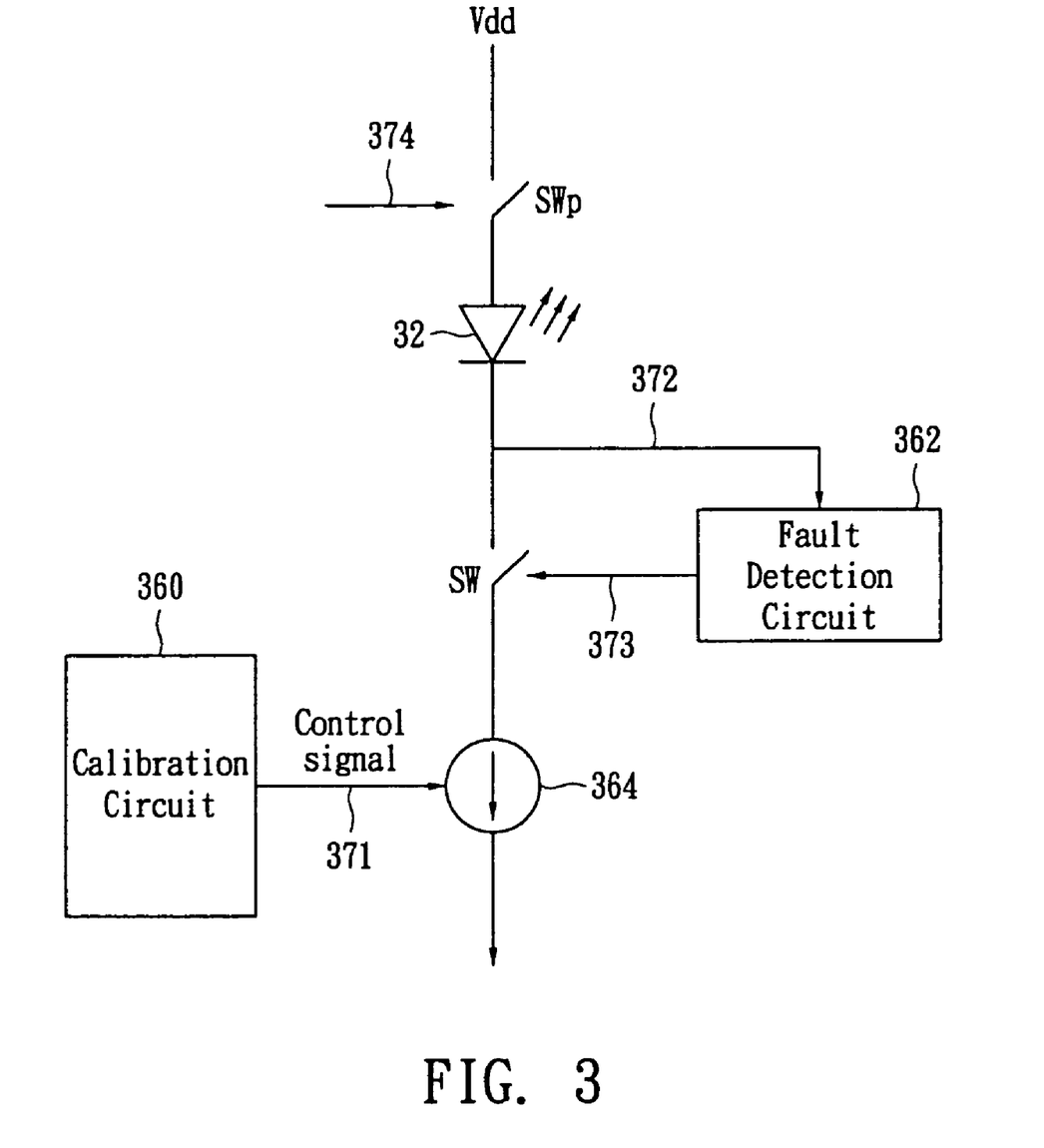
FIG. 3 shows a block diagram of a control circuit according to a preferred embodiment of the present invention.

FIG. 3 shows a block diagram of the control circuit 36 according to a preferred embodiment of the present invention. The control circuit 36 comprises a calibration circuit 360 for providing a control signal 371 to a current source 364 and a fault detection circuit 362 for sensing the current provided by the current source 364 and detecting fault conditions of the light source 32. The light source 32 is shown as a laser diode 32, but may be other light sources capable of emitting light. When the current provided to the light source 32 exceeds a predetermined upper limit value, the fault detection circuit 362 will detect the excessive current from the detection path 372 and generate a control signal 373 in response thereto. The control signal 373 may be used to reduce the current flowing through the light source 32, or to disconnect the current path between the light source 32 and the current source 364. Shown in the figure is the latter arrangement, and the control signal 373 is used to control a switch SW. Herein, the symbol SW between the light source 32 and the current source 364 is for illustration purpose only; it illustrates that no current will flow through the light source 32 when SW is in the illustrated open condition, whereby the light source 32, regardless whether it is an LED diode or a VCSEL diode, is prohibited from emitting light. The switch function may be achieved in many possible ways, some even do not require the use of a switching element at the shown location. Many variations and modifications can be made without departing from the scope of the invention. For example, if the current source 364 is provided by a transistor mirroring current from other transistors, the current of the light source 32 can be halted by stopping the mirror operation of the current. The symbol SW can also be implemented by a transistor, or a transmission gate, or otherwise.

According to one embodiment of the invention, there is another switch SWp interposed between the power Vdd and the light source 32. This is for the purpose of protecting the computer input apparatus during the manufacturing process or when it is in use. For instance, during the manufacturing process, it is possible that the signal 372 may be shorted to ground to cause a short current from the power Vdd to ground through the light source 32, which may be an LED diode. This additional switch SWp between the power Vdd and the light source 32 protects the computer input apparatus. A control signal 374 is provided to keep the switch SWp open, until the computer input apparatus is in a condition ready to operate. The switch SWp may be implemented by, e.g., a transistor (an NMOS transistor or a PMOS transistor), or a poly fuse. Furthermore, the control signal 374 can be a signal from a power on circuit (not shown) or a voltage detect circuit (not shown). The control signal 374 can be a signal from a timer circuit (not shown), too.

Figure 2:
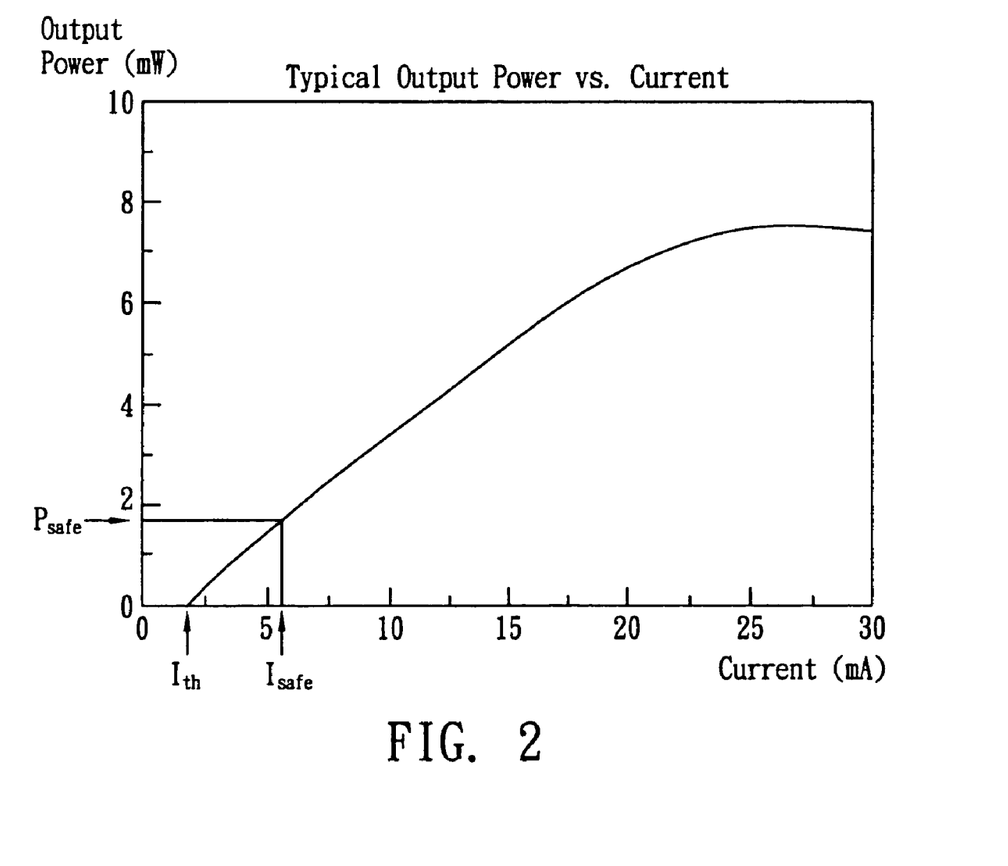
FIG. 2 shows an example of a relationship between driving current and output light power for a light source.

FIG. 2 shows an example of a relationship between driving current and output light power for a light source 32, which is preferably a coherent light source such as a laser diode according to an embodiment of the present invention. The control circuit 36 serves to maintain the optical power of the light source 32 under a power limit value Psafe for eye safety. More particularly, the calibration circuit 360 limits the driving current between a threshold current Ith and a safety limit current Isafe, which is the current corresponding to the Psafe. When the laser diode 32 is operated below the threshold current Ith, the laser diode 32 will not lase and the light generated is a non-coherent light. When the driving current exceeds the threshold current Ith, the laser diode 32 begins to lase and the light generated is a coherent light. Therefore, speckle pattern is exploited for controlling cursor movement. If the driving current exceeds the safety limit current Isafe, the emitted optical power also exceeds the power limit value Psafe and is potentially hazardous to human eyes. As shown in this figure, provided that the power limit value Psafe for eye safety is 1.5 mW, the safety limit current Isafe is about 6 mA. Therefore, the calibration circuit 360 according to the present invention will limit the driving current between the threshold current Ith (about 2 mA) and the safety limit current Isafe (about 6 mA); and the fault detection circuit 362 according to the present invention will disconnect the path between the light source 32 and the current source 364 once the current flowing through the light source 32 exceeds the safety limit current Isafe. This will be described in detail later. The safety limit current Isafe may vary, depending upon specific eye safety criterion and laser specification. Therefore, the above example is only demonstrative. For example, if the power limit value Psafe for eye safety is 0.74 mW for class 1 standard, the safety limit current Isafe is about 3 mA according to the laser characteristic shown in this figure. Other values can be used for other laser characteristics.

Figure 4A:
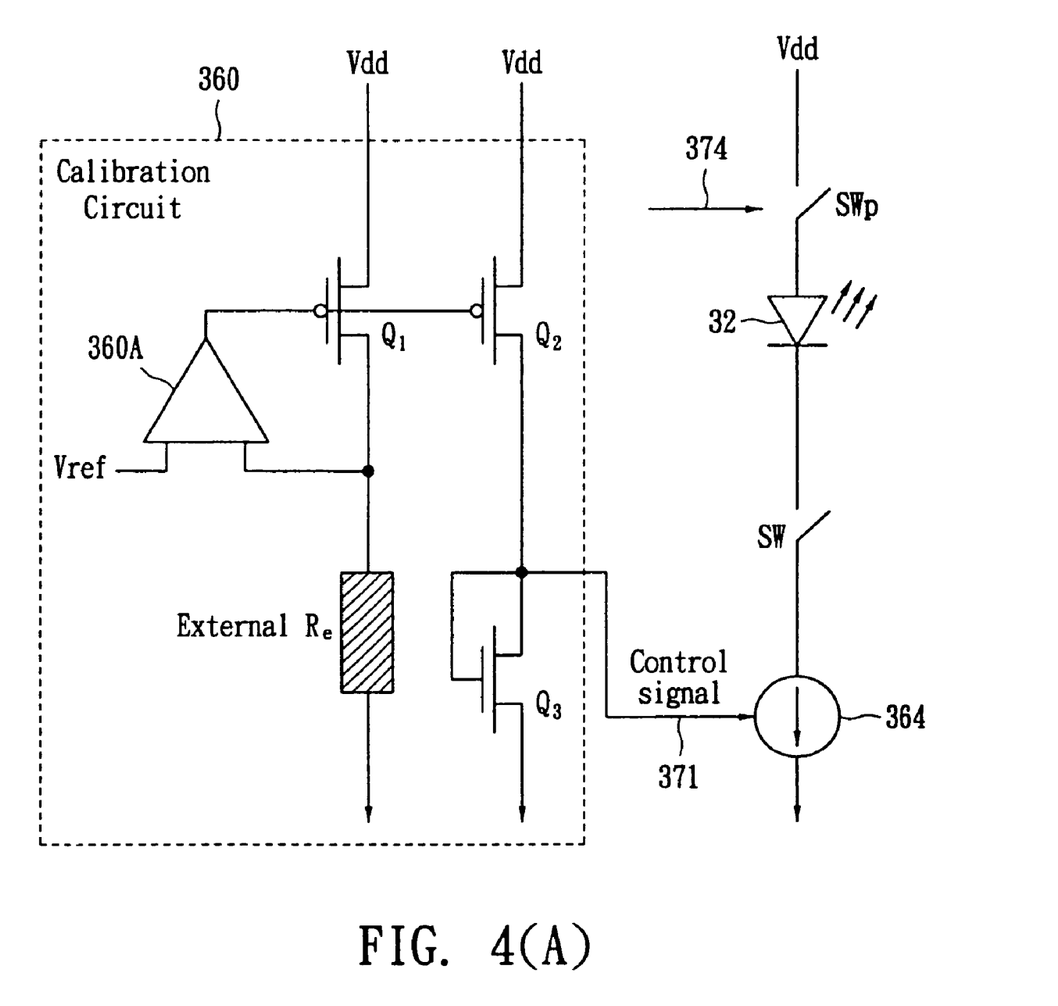
FIG. 4A shows a circuit diagram of a calibration circuit according to a preferred embodiment of the present invention.

FIG. 4A shows a detailed circuit diagram of the calibration circuit 360 according to an embodiment of the present invention. The calibration circuit 360 comprises a first amplifier 360A with a first input connected to a reference voltage Vref and a second input connected to an external resistor Re, a first transistor Q1 connected to the output of the first amplifier 360A and the second input of the first amplifier 360A, a second transistor Q2 with the gate thereof connected to the gate of the first transistor Q1, and a third transistor Q3, which functions as an active load of the second transistor Q2. When the reference voltage Vref is applied to the first input of the first amplifier 360A, a corresponding control signal 371 is generated at the drain of the third transistor Q3, and controls the current source 364 to supply a driving current Id in the range between the threshold current Ith and the safety limit current Isafe.

In one respect of the preferred embodiment of the invention, the first amplifier 360A, the external resistor Re and the first transistor Q1 form a circuit configuration of a simple regulator regulating the current flowing through the first transistor Q1. With natural calibration properties of the first amplifier 360A, the two inputs thereof are kept at the same voltage level such that the second input of the first amplifier 360A has the same voltage as the voltage level, i.e. the reference voltage Vref, of the first input of the first amplifier 360A. Therefore, the voltage level on the second input of the first amplifier 360A is fixed. When the voltage on the second input of the amplifier 360A is too low, the first amplifier 360A increases the output voltage (if the transistor Q1 is an NMOS transistor), or decreases the output voltage (if the transistor Q1 is a PMOS transistor). The transistor Q1 and transistor Q2 are PMOS transistors in the shown figure but may be arranged otherwise.

In the circuit configuration as shown, the transistor Q3 acts as a current mirror for current source 364 through the control signal 371, if the current source 364 uses NMOS transistors to pull down current from the light source 32. Thus, current flowing through the current source 364, which is the current flowing through the light source 32, is proportional to a reference current flowing through the transistor Q1 and the external resistor Re. By choosing an appropriate external resistor Re according to the safety standard specifications of the coherent light source 32, the safe operation current for the coherent light source 32 can be determined and controlled. The safe current is determined in proportion to Vref/Re. After the reference current, which is the current flowing through the transistor Q1, is determined and is within the safe operating range, the transistor Q2 can be used to steer the reference current into the transistor Q3. Generally, the transistor Q2 can share part of the burden required by the above-mentioned circuit configuration of the regulator. The transistor Q2 can increase the reference current produced by the above-mentioned regulator so as to overcome the restriction of the device dimension of the transistor Q1. The current consumption specification can be met and the tolerance requirement for resistor Re can be relaxed.

Alternatively, to reduce the cost, the transistor Q2 and transistor Q3 can be removed from the circuit, and the second input of the first amplifier 360A is used as the control signal 371, provided that an appropriate bias voltage is given to the current source 364, e.g., by modifying the voltage of Vref or providing a suitable current mirror biased at a voltage level equal to the voltage Vref. However, the burden to generate the necessary current will fall on the regulator itself as mentioned above.

Figure 4B:
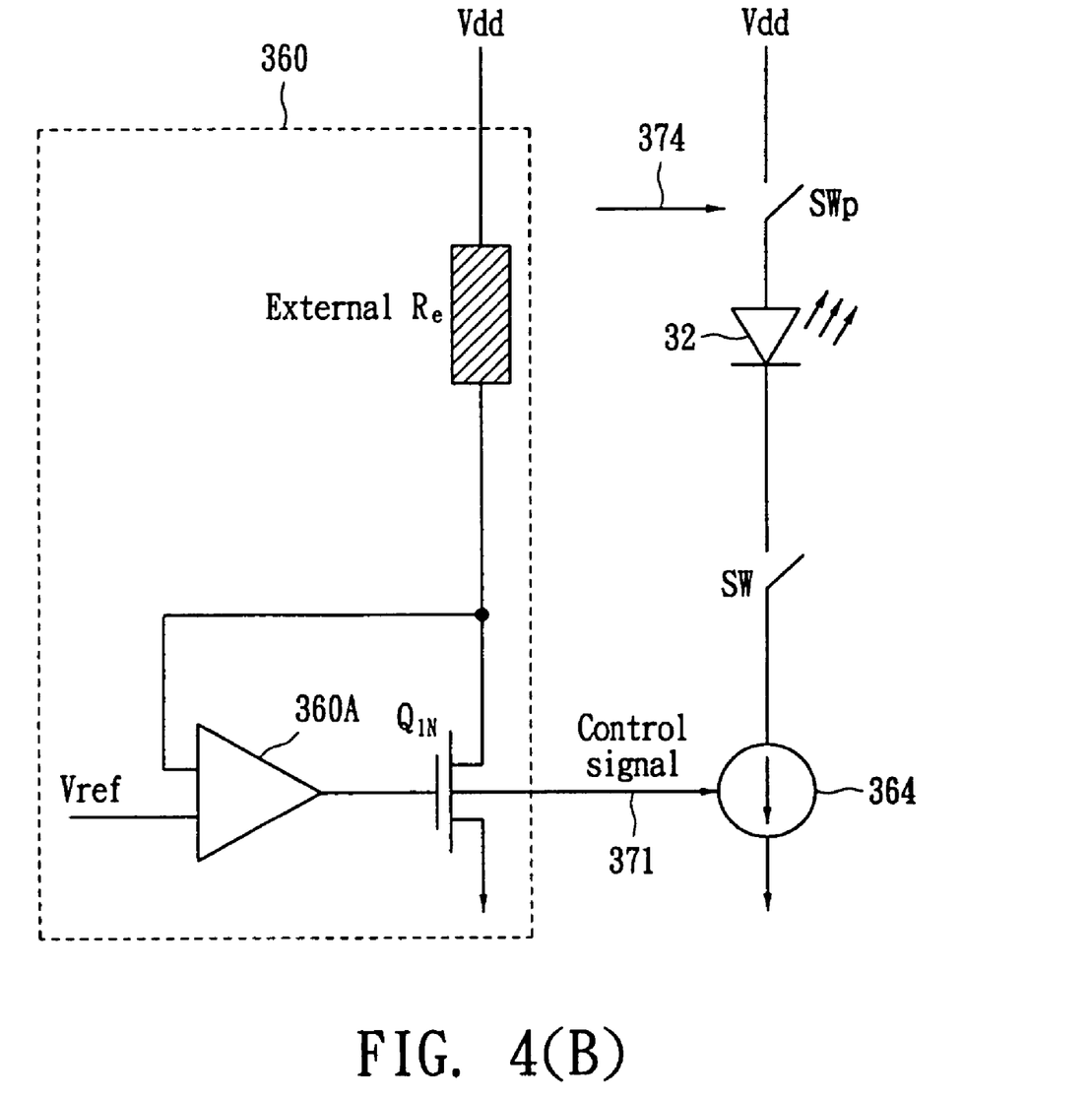
FIG. 4B shows a circuit diagram of a calibration circuit according to another preferred embodiment of the present invention.

Another example for removing the transistor Q2 and transistor Q3 without departing the scope and spirit of the invention is shown in FIG. 4B. The layout positions of the external resistor Re and the transistor are exchanged, and the original PMOS transistor Q1 is replaced with an NMOS transistor Q1N such that the resistor Re is connected to the power supply and the NMOS transistor is connected to the resistor Re and the ground. Furthermore, the output of the amplifier 360A is connected to a gate of the transistor, and the second input of the amplifier 360A is connected to a drain terminal of the NMOS transistor. With the latter circuit configuration, it is easier to adapt the calibration circuit of the invention to a computer input apparatus.

As described hereinbefore, an additional switch SWp and a control signal 374 may be further provided to protect the light source 32 from excess current or voltage irrespective of whether the occurrence of the excess current or voltage is a sudden surge or continues for a relatively long time.

Figure 5:
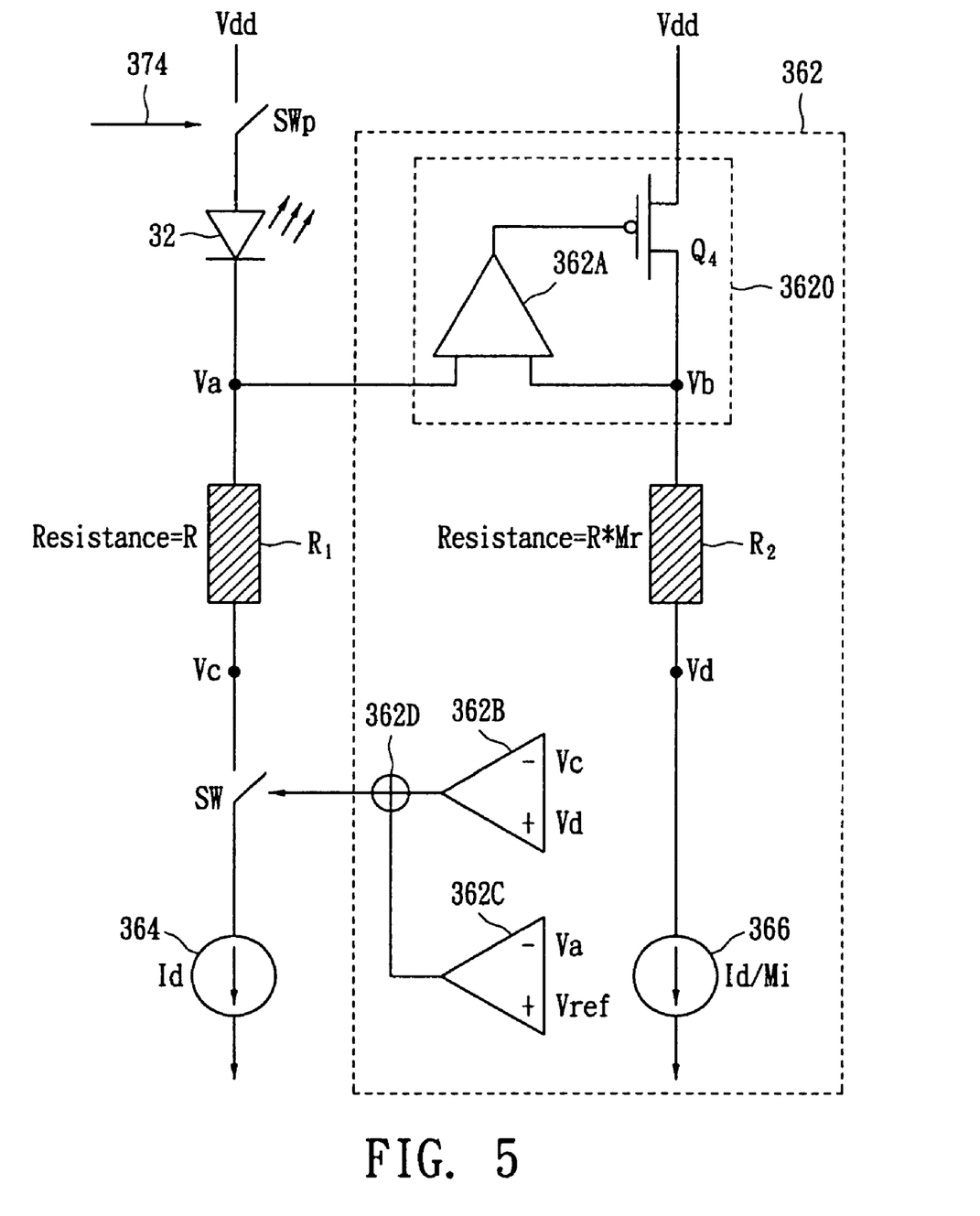
FIG. 5 shows a circuit diagram of a fault detection circuit according to a preferred embodiment of the present invention.

FIG. 5 shows a detailed circuit diagram of the fault detection circuit 362 according to an embodiment of the present invention. A voltage replication circuit 3620 is provided to replicate substantially the same voltage level at the node Vb as the voltage level VA at the node Va. The voltage level at node Vb is VB, which is controlled by the voltage replication circuit 3620 to be substantially equal to VA. The voltage replication circuit 3620 may be implemented in many possible ways, one of which is shown in the figure which includes a second amplifier 362A and a fourth transistor Q4. The gate of the fourth transistor Q4 is connected to the output end of the second amplifier 362A. The source/drain of the transistor Q4 are connected to a voltage source Vdd and the second input end (i.e., node Vb) of the second amplifier 362A, respectively. The first input end (i.e., node Va) of the second amplifier 362A is connected to the current source 364 through the first resistor R1 with resistance R, and the second input end of the second amplifier 362A is further connected to a comparison current source 366 (hereinafter also referred to as the auxiliary current source 366) through a second resistor R2 with resistance (R*Mr), where Mr is a predetermined value. The first input end of the second amplifier 362A is further connected to the cathode of the laser diode 32. The fault detection circuit 362 comprises the voltage replication circuit 3620, the load resistor R2, the comparison current source 366, a first comparator 362B, a second comparator 362C, and a digital unit 362D.

There is a switch SW shown in the figure, between the light source 32 and the current source 364. As explained hereinbefore, this is for illustration purpose only; it illustrates that no current will flow through the light source 32 when SW is in the illustrated open condition, whereby the light source 32, regardless whether it is an LED diode or a VCSEL diode, is prohibited from emitting light. The switch function may be achieved in many possible ways; for example, if the current source 364 is provided by a transistor mirroring current from other transistors, the current of the light source 32 can be halted by stopping the mirror operation of the current.

The current source 364 supplies a driving current Id for the laser diode 32 and the auxiliary current source 366 supplies an auxiliary current Id/Mi, where Mi is a predetermined value. In the fault detection circuit 362, the negative terminal of the first comparator 362B is connected to the node Vc, which has a voltage VC=VA−R*Id; the positive terminal of the first comparator 362B is connected to the node Vd, which has a voltage VD=VB−R*Id*(Mr/Mi). As described hereinbefore, the virtual ground of the second amplifier 362A will force the voltage VB at node Vb to be equal to the voltage VA at node Va. The parameters Mr and Mi are selected such that the voltage VC at node Vc is slightly larger than the voltage VD at node Vd under normal conditions. Therefore, the output of the first comparator 362B is LOW under normal conditions. Once the current Id provided by the current source 364 increases to exceed the safety limit current Isafe, the voltage VC at node Vc will decrease and the output of the first comparator 362B is HIGH. The digital unit 362D is, for example, an OR gate and will trigger the switch SW to disconnect the node Vc from the current source 364 when excessive driving current occurs.

The negative terminal of the second comparator 362C is connected to the node Va, which is the cathode of the laser diode 32, and the positive terminal of second comparator 362C is connected to the reference voltage Vref. Under normal conditions, the voltage VA at the node Va is larger than the reference voltage Vref, and the output of the second comparator 362C is LOW. If the cathode of the laser diode 32 is shorted to ground, the output of the second comparator 362C will be HIGH. Thus, the digital unit 362D will trigger the switch SW to disconnect the node Vc from the current source 364. Through the above arrangement, the fault detection circuit 362 can disconnect the current supplied to the laser diode 32 should fault conditions, such as excessive driving current or unintentional grounding, occur. However, the fault detection circuit 362 can be adapted to detect other faults and take additional measures, as appreciated by those skilled in the art, to terminate such a fault.

In FIG. 5, as mentioned above, an additional switch SWp and a control signal 374 may be used to protect the light source 32 from excess current or voltage, irrespective of whether the occurrence of the excess current or voltage is a sudden surge or continues for a relatively long time.

Figure 6:
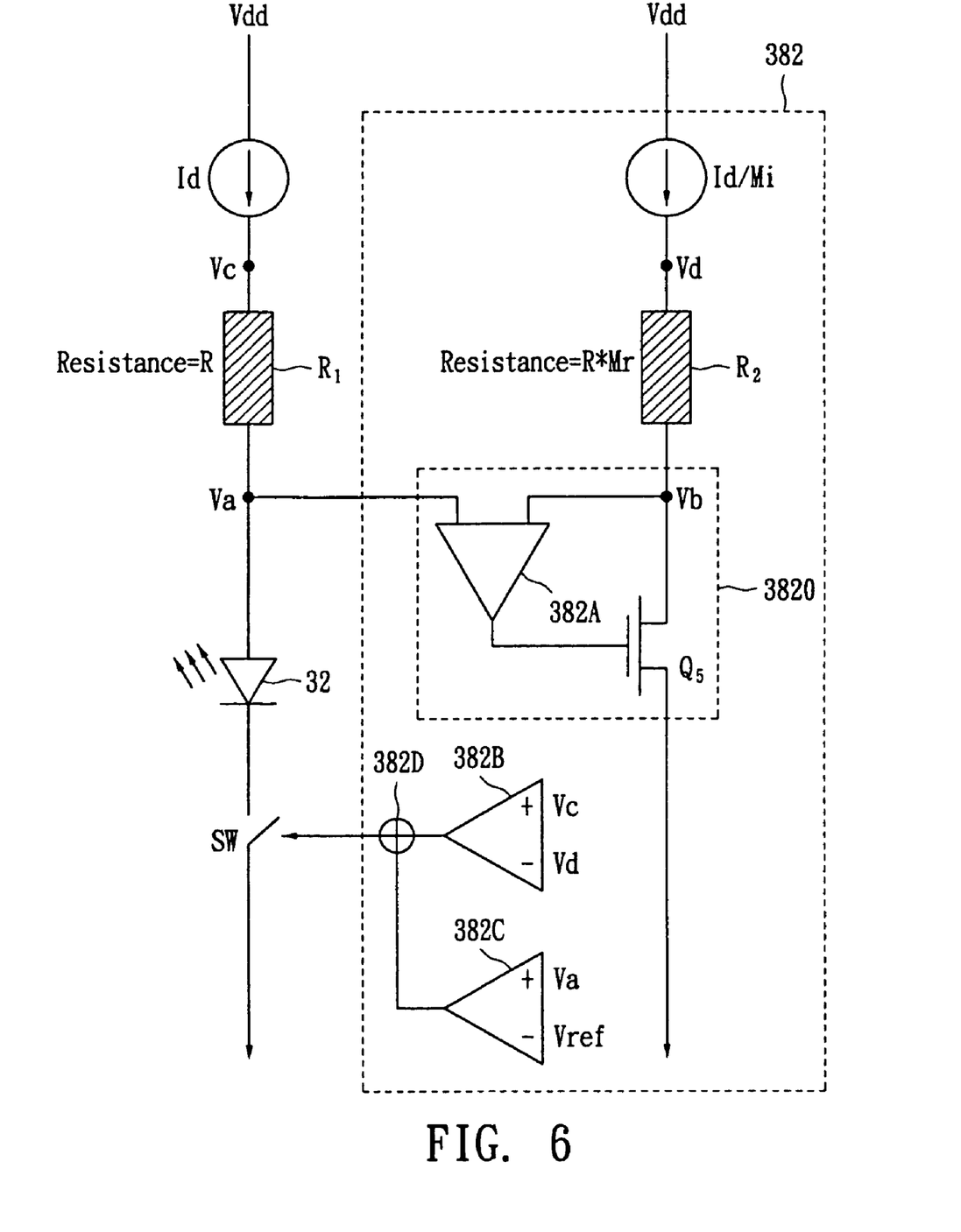
FIG. 6 shows a circuit diagram of a fault detection circuit according to another preferred embodiment of the present invention.

FIG. 6 shows a detailed circuit diagram of a fault detection circuit 382 according to another embodiment of the present invention. The corresponding control circuit (not shown) employing this fault detection circuit 382 is different from the control circuit 36 shown in FIG. 3 in that the fault detection circuit 362 in FIG. 3 is replaced by the fault detection circuit 382, and the path 372 shown in FIG. 3 is modified to connect to the anode of the light source 32 instead of the cathode of the light source 32. The other part of the control circuit is similar to what is shown in FIG. 3, and thus for simplicity, detailed explanation thereof is omitted.

Referring to FIG. 6, a voltage replication circuit 3820 is provided to replicate substantially the same voltage level at the node Vb as the voltage level VA at the node Va. The voltage level at node Vb is VB, which is controlled by the voltage replication circuit 3820 to be substantially equal to VA. The voltage replication circuit 3820 may be implemented in many possible ways, one of which is shown in the figure which includes a third amplifier 382A and a fifth transistor Q5. The gate of the fifth transistor Q5 is connected to the output end of the third amplifier 382A. The source/drain of the transistor Q5 are connected to ground and the second input end (i.e., node Vb) of the third amplifier 382A, respectively. The first input end (i.e., node Va) of the third amplifier 382A is connected to the current source 384 through the third resistor R3 with resistance R, and the second input end of the third amplifier 382A is further connected to a comparison current source 386 (hereinafter also referred to as the auxiliary current source 386) through a fourth resistor R4 with resistance (R*Mr), where Mr is a predetermined value. The first input end of the third amplifier 382A is further connected to the anode of the laser diode 32. The fault detection circuit 382 comprises the voltage replication circuit 3820, the load resistor R4, the comparison current source 386, a third comparator 382B, a fourth comparator 382C, and a digital unit 382D.

There is a switch SW shown in the figure, between the light source 32 and ground. As explained hereinbefore, this is for illustration purpose only, and the function of the switch may be realized in many forms.

The current source 384 supplies a driving current Id for the laser diode 32, and an auxiliary current source 386 supplies an auxiliary current Id/Mi, where Mi is a predetermined value. In the fault detection circuit 382, the positive terminal of the third comparator 382B is connected to the node Vc, which has a voltage VC=VA+R*Id; the negative terminal of the third comparator 382B is connected to the node Vd, which has a voltage VD=VB+R*Id*(Mr/Mi). The parameters Mr and Mi are selected such that the voltage VC at node Vc is slightly larger than the voltage VD at node Vd under normal conditions. Therefore, the output of the third comparator 382B is LOW under normal conditions. Once the current Id provided by the current source 384 increases to exceed the safety limit current Isafe, the voltage VC at node Vc will increase and the output of the third comparator 382B is HIGH. The digital unit 382D is, for example, an OR gate and will trigger the switch SW to disconnect the node Vc from the current source 384 when excessive driving current occurs.

The positive terminal of the fourth comparator 382C is connected to the node Va, which is the anode of the laser diode 32, and the negative terminal of fourth comparator 382C is connected to the reference voltage Vref. Under normal conditions, the voltage VA at the node Va is larger than the reference voltage Vref, and the output of the fourth comparator 382C is LOW. If the anode of the laser diode 32 is shorted to ground, the output of the fourth comparator 382C will be HIGH. Thus, the digital unit 382D will trigger the switch SW to disconnect the node Vc from the current source 384. Through the above arrangement, the fault detection circuit 382 can disconnect the current supplied to the laser diode 32 should fault conditions, such as excessive driving current or unintentional grounding, occur.

In FIG. 6, similarly to what has been described above, an additional switch SWp and a control signal 374 may be used to protect the light source 32 from excess current or voltage, irrespective of whether the occurrence of the excess current or voltage is a sudden surge or continues for a relatively long time.

In the above-described optical mouse 10, the control circuit 36 could be integrated with the light source 32 or the sensor 34 in one single circuit chip to reduce product cost.

Moreover, the above-described optical mouse 10 could be equipped with a wireless transceiver to provide wireless operation. The optical mouse 10 could also be equipped with an optical element such as lens, grating, hologram or interferogram, or combinations thereof, to enhance optical function. The optical mouse 10 could also be equipped with a rolling ball, or equipped with a protective cover on the location of the aperture 14 to protect internal circuits in the mouse. Such arrangements are encompassed in the scope of the present invention.

In summary, according to certain embodiments of the present invention, an optical mouse uses a simplified optical element and electronic circuits to keep the optical power of the coherent light source to be below a power limit value safe for human eyes.

Although the present invention has been described with reference to the preferred embodiment thereof, it should be understood that the invention is not limited to the details thereof. Various substitutions and modifications on the illustrated circuit configuration or hardware structure have been suggested in the foregoing description, and other will occur to those of ordinary skill in the art. For instance, the current source of the light source can be replaced by a pull-up device coupled and positioned between the power and the light source. Therefore, all such substitutions and modifications are intended to be embraced within the scope of the invention as defined in the appended claims.

What is claimed is:

1. A computer input apparatus, the apparatus comprising:
   a light source to project light on a working surface;
   a sensor to capture reflected images from said working surface; and
   a control circuit having a calibration circuit to control power provided to said light source, wherein said calibration circuit comprises:
      an amplifier having a first input of a reference voltage;
      a first transistor having a gate connected to an output of said amplifier;
      an external resistor having one terminal connected to a second input of said amplifier;
      wherein said first transistor has one other terminal connected the second input of the amplifier; and
      wherein said first input and said second input of said amplifier form a virtual ground.

2. The computer input apparatus according to claim 1, wherein said calibration circuit further comprises:
   a second transistor having a gate connected to said gate of said first transistor;
   a third transistor having a gate connected to one terminal thereof;
   wherein one terminal of said second transistor is connected to said power and the other terminal of said second transistor is connected to said gate of said third transistor;
   wherein the other terminal of said third transistor is connected to said ground.

3. The computer input apparatus according to claim 2, wherein said gate of said third transistor provides an output voltage to said light source.

4. A computer input apparatus, the apparatus comprising:
   a light source to project light on a working surface;
   a sensor to capture reflected images from said working surface; and
   a control circuit having a fault detection circuit to control power provided to said light source,
   wherein said control circuit includes:
      a first current source providing current to said light source, and
      a first resistor having one terminal connected to one end of said light source,
      said first current source, said first resistor and said light source forming a first current path,
   and wherein said fault detection circuit comprises:
      a second current source providing current to a second current path different from said first current path;
      a voltage replication circuit for replicating the same voltage of said one end of said light source to a node in said second current path; and
      a second resistor having one terminal connected with said node of said another current path;
      wherein the voltage level at the other terminal of said first resistor is compared with the voltage level at the other terminal of said second resistor to generate a control signal.

5. The computer input apparatus according to claim 4, wherein said voltage replication circuit comprises:
   an amplifier having a first input connected to said one end of said light source, a second input connected to said node in said second current path, and an output; and
   a transistor having a gate connected to said output of said amplifier and one terminal connected to said node in said second current path.

6. The computer input apparatus according to claim 4, wherein the resistance of said second resistor is a first multiple of the resistance of said first resistor, and said current provided by said first current source is a second multiple of said current provided by said second current source.

7. The computer input apparatus according to claim 4, wherein said voltage level at said other terminal of said first resistor is compared with said voltage level at said other terminal of said second resistor by a comparator.

8. The computer input apparatus according to claim 4, further comprising:

a comparator to compare said voltage level of said one end of said light source and a reference voltage.

9. The computer input apparatus according to claim 4, further comprising:
- a first comparator to compare said voltage level at said other terminal of said first resistor with said voltage level at said other terminal of said second resistor;
- a second comparator to compare said voltage level of one end of said light source and a reference voltage; and
- a digital unit receiving output signals from said first comparator and said second comparator and generating said control signal.

10. A computer input apparatus, comprising:
- a light source to project a light on a working surface;
- a sensor to capture reflected images from said working surface;
- a control circuit having a fault detection circuit, a first current source to provide a current flowing through said light source, and a calibration circuit to control said first current source by a first control signal to provide said current in a specific range between a threshold current and a safety current of said light source;
- wherein said fault detection circuit controls said first current source by a second control signal to avoid excessive current flowing through said light source, and
wherein said calibration circuit comprises a regulator to further control said first current source based upon a reference voltage.

11. The computer input apparatus according to claim 10, wherein the control circuit is integrated with said sensor.

12. The computer input apparatus according to claim 10, further comprising:
- a switch interposed between a power supply and said light source to selectively turn off said light source.

13. The computer input apparatus according to claim 12, wherein said switch is controlled by a third control signal to selectively turn off said light source.

* * * * *